United States Patent [19]
Yoshida et al.

[11] Patent Number: 5,922,445
[45] Date of Patent: Jul. 13, 1999

[54] COMPOSITE MATERIAL AND PROCESS FOR PRODUCTION OF SAME

[75] Inventors: Minoru Yoshida; Shinichi Okajima, both of Takatsuki; Minoru Fukui, Suita, all of Japan

[73] Assignee: Asahi Kasei Kogyo Kabushiki Kaisha, Osaka, Japan

[21] Appl. No.: 08/448,521

[22] PCT Filed: Nov. 5, 1993

[86] PCT No.: PCT/JP93/01611

§ 371 Date: Jun. 14, 1995

§ 102(e) Date: Jun. 14, 1995

[87] PCT Pub. No.: WO95/12706

PCT Pub. Date: May 11, 1995

[30] Foreign Application Priority Data

| May 7, 1992 | [JP] | Japan | 4-114431 |
| Feb. 15, 1993 | [JP] | Japan | 5-025090 |
| Apr. 30, 1993 | [JP] | Japan | 5-103372 |

[51] Int. Cl.$^6$ .............. B32B 3/00; B32B 33/00; B32B 27/12; B32B 27/40
[52] U.S. Cl. .......... 428/245; 428/288; 428/298; 428/304.4; 428/308.4; 428/311.1; 428/317.9; 428/260; 428/904
[58] Field of Search ........... 428/85, 91, 96, 428/245, 288, 298, 904, 304.4, 308.4, 311.1, 317.9, 260

[56] References Cited

U.S. PATENT DOCUMENTS

| Re. 31,601 | 6/1984 | Ikeda et al. | 428/96 |
| 4,318,949 | 3/1982 | Okamoto et al. | 428/96 |
| 4,386,127 | 5/1983 | Tanaka et al. | 428/91 |
| 4,973,510 | 11/1990 | Tanaka . | |

FOREIGN PATENT DOCUMENTS

| 45-18745 | 6/1970 | Japan . |
| 45-33797 | 10/1970 | Japan . |
| 49-109697 | 10/1974 | Japan . |
| 56-379 | 1/1981 | Japan . |
| 58-9191 | 2/1983 | Japan . |
| 58-144178 | 8/1983 | Japan . |
| 6075683 | 4/1985 | Japan . |
| 61-42033 | 9/1986 | Japan . |
| 1-85377 | 3/1989 | Japan . |
| 2-182902 | 7/1990 | Japan . |
| 2-264074 | 10/1990 | Japan . |
| 5-132878 | 5/1993 | Japan . |

OTHER PUBLICATIONS

Copy of ROC Office Action dated Jul. 14, 1995 (including English–language translation).

*Primary Examiner*—Marion E. McCamish
*Assistant Examiner*—Elizabeth M. Cole
*Attorney, Agent, or Firm*—Finnegan, Henderson, Farabow, Garrett & Dunner, L.L.P.

[57] ABSTRACT

A sheet-like composite material which is obtained by coating or impregnating a fibrous base material with an elastic polymeric substance, in which the fibers constituting the fibrous base material and the elastic polymeric substance are prevented from bonding with each other, and which is extremely flexible and has excellent wear resistance and an extremely high peel strength, which material may be produced for example by applying a hydrophobicizing treatment to the fibrous base material, then impregnating or coating a solution of the elastic polymeric substance to which a hydrophilic silicone has been added, and wet solidifying.

9 Claims, 3 Drawing Sheets

5,922,445

COMPOSITE MATERIAL AND PROCESS FOR PRODUCTION OF SAME

This is a 371 application of PCT JP93/0611 filed Nov. 5, 1993.

TECHNICAL FIELD

The present invention relates to a composite material, which is flexible and durable, composed of fibrous base materials such as a yarn, woven fabric, nonwoven fabric, impregnated or coated with an elastic polymeric substance, and to a process for the production of the same. More specifically, the present invention relates to a composite material (i) which is flexible and yet superior in the peel strength of the coating layer and other dynamic strength in the case of being coated and (ii) which is flexible and superior in the wear resistance and other durability contradictory to the same in the case of being impregnated, and to a process for the production of the same. Furthermore, the present invention relates to a composite material which is superior in flexibility and which is superior in durability maintaining its functions even after wearing and washing even in the case of impregnating or coating an elastic polymeric substance to which have been added antibacterial, deodorizing, heat storage, and moisture absorbing functional particles.

BACKGROUND ART

In recent years, interest has risen in comfort and health, in particular with respect to applications of clothing and daily necessities. Also, fabrics are being asked to (a) have high functionality, such as an antibacterial action, odor preventing action, deodorizing action, shielding from ultraviolet light, heat storage, etc. and (b) have comfort-related functions such as moisture permeability, waterproofness, water repellency, etc. for allowing sweat etc. to evaporate and the wearer to keep dry. As a method for realizing the functions of (a) above, use is generally made of the method for mixing in particles having the above functions with the yarn itself at the spinning stage (see Japanese Unexamined Patent Publication (Kokai) No. 2-182902) and the method of imparting the same by after-treatment methods such as impregnating or coating a fabric with a urethane or other resin in which particles have been added (see Japanese Unexamined Patent Publication (Kokai) No. 2-264074).

In the former method of mixing particles into the fibers, particles of a size on the submicron order enabling spinning are required. Even if addition is possible, the particles may lose their function due to the spinning conditions (particularly heat), the strength of the yarn may deteriorate or the spinning yield may fall, or it might not be possible to deal with small lots. For these and other reasons, it has been more convenient to impart the function by resin treatment and other after-treatment methods. In such after-treatment methods, however, there is the disadvantage that the resin constrains the fibers and therefore the feel of the fibrous substrate is remarkably impaired. Further, there was the problem that the resin itself would fall away during use or washing and the function would be lost.

On the other hand, a fabric having the functions of (b), that is, moisture permeability, waterproofness, and water repellency, is made much use of in sportswear applications such as for windbreakers. This fabric is generally obtained by coating a fabric with a urethane which foams at the time of solidification. In this case too, due to the entrance of the resin inside the fabric structure, there is the problem that the freedom of the fabric becomes remarkably lower and the feeling of the fiber becomes hard. The hardness of the feel cannot be avoided even with use of soft resins such as a urethane.

Therefore, to solve the above-mentioned problems, in the case of a moisture-permeable waterproof fabric coated with an elastic polymeric substance for use for a windbreaker etc., it has been considered to improve the feeling by controlling the permeation of the elastic polymeric substance into the fabric. As such a method, there are the method of applying hot calendering to the fabric to press the surface of the fabric and smooth it and the method of applying a fluorine compound or other repellent to the fabric in advance so as to prevent permeation (see Japanese Unexamined Patent Publication (Kokai) No. 58-144178).

In this method, however, since the fabric is smoothed by a hot calender, the fabric as a whole is given a paper-like hard feeling. Further, there is less permeation of the elastic polymeric substance, and therefore, the problems such as decrease in the peel strength of the film of the elastic polymeric substance. Even when treating the fabric by a repellent, since there is less permeation of the elastic polymeric substance in the same way, there is the problem of decrease in the peel strength of the film of the elastic polymeric substance.

Next, looking at an artificial leather composite material of a nonwoven fabric and an elastic polymeric substance (mainly urethane), coated artificial leather obtained by impregnating a nonwoven fabric with an elastic polymeric substance and forming on the surface of the impregnated substrate a covering layer of an elastic polymeric substance or a suede-like or nubuck-like product obtained by buffing the impregnated substrate to form a fiber pile layer are being used for shoe materials, coats and other garments, and furniture. In these applications, a feeling closer to that of natural leather is sought. Research is under way on a more flexible artificial leather. These studies are trying to obtain greater flexibility by inhibiting the bonding between the fibers and urethane.

For example, there are the following:

(i) An artificial leather obtained by impregnating an elastic polymeric substance into a nonwoven fabric, a paste polymeric substance with a different solvent from the impregnated elastic polymeric substance, covering the surface of the constituent fibers of the nonwoven fabric or filling part of the space created by the constituent fibers and solidifying the same, then removing the paste polymeric substance to form cavities between the fibers and elastic polymeric substance (for example, see Japanese Examined Patent Publication (Kokoku) No. 45-18745 and Japanese Unexamined Patent Publication (Kokai) No. 49-109697), (ii) An artificial leather obtained by treating a nonwoven fabric by a silicone resin, followed by impregnating the same with an elastic polymeric substance, whereby the bonding between the fibers and the elastic polymeric is prevented (see Japanese Examined Patent Publication (Kokoku) No. 45-33797), (iii) An artificial leather obtained by applying, to a nonwoven fabric, a pretreatment solution comprising mainly colloidal silica, causing migration of the colloidal silica at the time of drying to cause greater presence at the surfaces of the nonwoven fabric, impregnating and solidifying an elastic polymeric substance, then pulverizing and removing the colloidal silica by a mechanical method so as to change the amount of the elastic polymeric substance impregnated into the nonwoven fabric, in the direction of thickness of the nonwoven fabric (see Japanese Examined Patent Publication (Kokoku) No. 58-9191), (iv) An artificial leather obtained by the process of production of treating a nonwoven fabric with a surfactant to make the fiber surface hydrophilic, followed by impregnating a solution of a solvent based elastic polymeric substance to which a surfactant has been added, then causing the elastic polymeric substance to solidify in water so as to facilitate permeation of water at the interface of the fibers and the elastic polymeric substance and obstruct bonding of the fibers and elastic polymeric substance (see Japanese Examined Patent Publication (Kokoku) No. 61-42033), and (v) An artificial leather obtained by the process of impregnating a nonwoven fabric comprising islands-in-sea fibers with a solution of an elastic polymeric substance, then causing the elastic polymeric substance to solidify in water and suitably thereafter dissolving out the sea component of the islands-in-sea fibers by a solvent so as to create a substantially complete nonbonded state between the remaining island component fibers and the elastic polymeric substance (see Japanese Unexamined Patent Publication (Kokai) No. 64-85377).

These known artificial leathers, however, have had the following problems:

That is, regarding the artificial leather of (i), (a) a sufficient flexibility could not be obtained since the paste polymeric substance used for the pretreatment did not sufficiently coat the fibers as a whole.

Further, when a large amount of the paste polymeric substance was used to try to obtain sufficient flexibility, (b) the impregnability of the elastic polymeric substance became poor and a sufficient dynamic strength could not be exhibited, (c) the productivity fell, and (d) the increase in the cost of recovery for treating the waste liquor.

Regarding the artificial leather of (ii), (a) a nonwoven fabric treated with a silicone resin fell in strength and easily deformed in shape during the processing, making it susceptible to trouble in the cutting and other processes and (b) the mold releasability of the silicone was made sufficient use of, but there was insufficient prevention of bonding between the fibers and elastic polymeric substance and the flexibility was inferior.

On the other hand, regarding the artificial leather of (iii), (a) the colloidal silica used for the pretreatment collected at the surface layer portions of the nonwoven fabric due to migration, and therefore, the fibers and elastic polymeric substance bonded at the center portion of the nonwoven fabric. Further, even at the surface layer portions, the ratio of bonding of the fibers and elastic polymeric substance was low, but the majority of the fibers were partially bonded and (b) there was a problem of the residue of the colloidal ilica and uneven dyeing.

Regarding the artificial leather of (iv), (a) the bonding was insufficiently prevented, numerous partial bonded structures were seen, and there was insufficient flexibility.

Regarding the artificial leather of (v), (a) the leather was flexible, but small denier island components remained, and therefore, the wear resistance and other dynamic strength were inferior, (b) the fibers were limited to special fibers of the islands-in-sea type, and (c) it took time to dissolve out the sea component and there were problems environmentally speaking as well.

As explained above, at the present time, none of the artificial leathers simultaneously satisfies the contradictory properties of flexibility and high dynamic strength (in particular wear resistance).

DISCLOSURE OF THE INVENTION

Accordingly, the objects of the present invention are to provide a composite material composed of fibrous base materials such as yarns, a woven fabric, nonwoven fabrics, impregnated or coated with an elastic polymeric substance which solves the above problems in the prior art and (i) is superior in peel strength of the coating layer while being flexible in the case of coating and (ii) is flexible and superior in the contradictory properties of wear resistance and other durability and tear strength and other dynamic strength, and a process for production of the same.

That is, a composite material satisfying the first object of the present invention, that is, one which has a coating layer of an elastic polymeric substance and is flexible and has a high peel strength, is achieved by a sheet-like composite material comprising a fibrous base material coated with an elastic polymeric substance, wherein (i) said elastic polymeric substance penetrates deeper than the fibers present at the interface between the fibrous base material and said elastic polymeric substance in the cross-section of said composite material and (ii) the ratio Nn/Nt of the total number of fibers Nt present in a cross-section of the composite material and the number of fibers Nn not bonded at all with the elastic polymeric substance on the circumference of the fiber cross-section in the total number of fibers is 0.3 to 1.

A composite material satisfying the second object of the present invention, that is, one which has an elastic polymeric substance impregnated in the fibrous base material and is flexible and has wear resistance and other durability and dynamic strength, is achieved by a sheet-like composite material comprising a fibrous base material impregnated with an elastic polymeric substance, wherein (i) the ratio Nn/Nt of the total number of fibers Nt present in a cross-section of the composite material and the number of fibers Nn not bonded at all with the elastic polymeric substance on the circumference of the fiber cross-section in the total number of fibers is 0.3 to 1 and (ii) the rate of impregnation of the elastic polymeric substance at the center portion is higher than the rate of impregnation of the elastic polymeric substance at the surface layer portions of the composite material.

Further, the composite material according to the present invention may be produced, when coating or impregnating an elastic polymeric substance on the fibrous base material, by (i) depositing on the fibrous base material a hydrophobic pretreatment agent comprised mainly of a water repellent silicone, (ii) coating or impregnating the base material with a solution of the elastic polymeric substance to which a hydrophilic silicone has been added, and (iii) immersing the substrate in a poor solvent of said elastic polymeric substance or spraying a good solvent on it first when drying so as to cause the poor solvent to remain and solidify the elastic polymeric substance.

Further, the composite material according to the present invention may be produced, when coating an elastic polymeric substance on the fibrous base material, by (i) depositing on said fibrous base material a hydrophobic pretreatment agent comprising a fluorine-based water repellent alone or a mixture thereof with a water repellent silicone, (ii) coating the base material with a solution of the elastic polymeric substance with a hydrophilic silicone added, and (iii) immersing the base material in a poor solvent of the elastic polymeric substance or spraying a good solvent at the time of drying so as to cause the good solvent to remain and solidify the elastic polymeric substance, whereby the trouble in processing like the elastic polymeric substance leaking through the fibrous base material is prevented.

BRIEF DESCRIPTION OF THE DRAWINGS

The present invention will be explained below with reference to the drawings.

FIG. 4(a) is an electron micrograph (2500X) of part of the cross-section of a composite material impregnated with an elastic polymeric substance of the invention of the present application, while

BEST MODE FOR CARRYING OUT THE INVENTION

The present inventors noted the structure wherein the elastic polymeric substance and the fibers are not bonded (nonbonded structure) as a structure not causing deterioration of the feel at the time of impregnating or coating a fibrous base material with an elastic polymeric substance. They engaged in intensive studies on the structure of a composite material for forming a sufficient nonbonded structure of the elastic polymeric substance and fibers without use of special fibers such as islands-in-sea fibers and for simultaneously satisfying the contradictory properties of the peel strength of the elastic polymeric substance layer and a strong wear resistance, and a process for achieving the same, whereby the present invention has been completed.

To facilitate understanding of the present invention, an explanation will be made of the gist of the present invention using the drawings.

Figure 1:
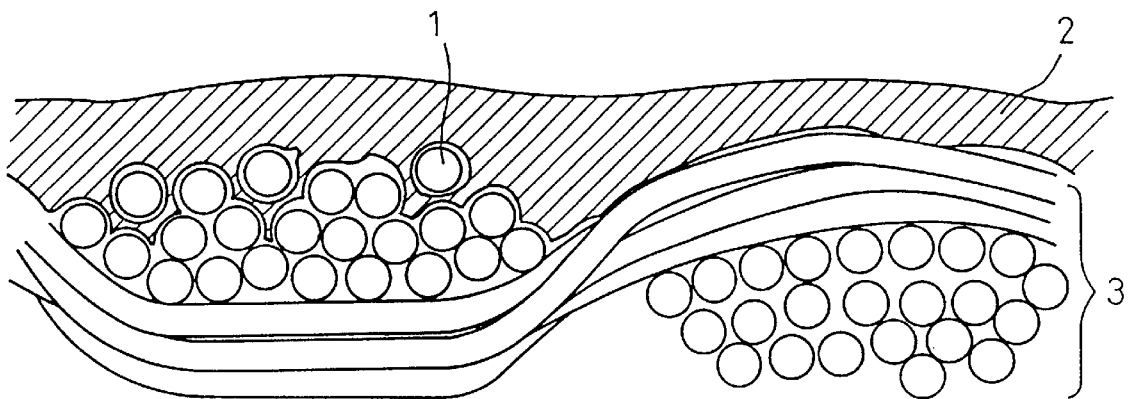
FIG. 1 is an enlarged cross-sectional view of a composite material wherein an elastic polymeric substance 2 of the present invention is coated on a fibrous base material 3 (woven fabric). Reference numeral 1 shows a fiber enclosed by the elastic polymeric substance in a nonbonded manner among the fibers present at the interface of the fibrous base material and the elastic polymeric substance.
Figure 3:
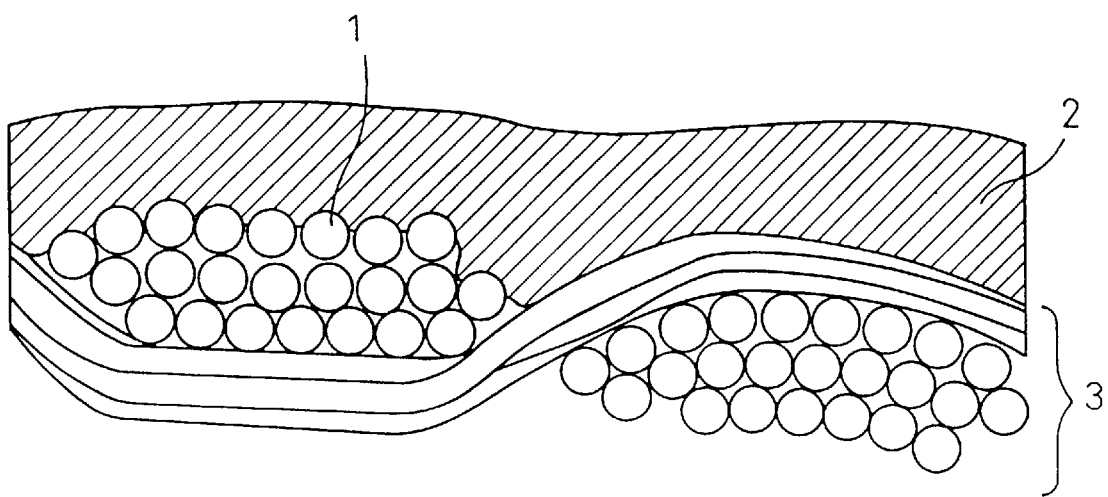
FIG. 3 is an enlarged sectional view of a composite material produced in the prior art in which the fibrous base material 3 (woven fabric) is coated with an elastic polymeric substance 2. Reference numeral 1 shows a fiber which is bonded with the elastic polymeric substance among the fibers present at the interface of the fibrous base material and the elastic polymeric substance.

FIG. 1 is a view of the enlarged cross-sectional structure of a sheet-like composite material which is obtained by coating a fibrous substrate 3 (woven fabric) with an elastic polymeric substance 2 (urethane) in one example of the present invention, is flexible and makes little noise, has a large peel strength of the coating layer, and is used for a windbreaker. From FIG. 1, it is clear that (a) the majority of the fibers at the surface of the fibrous base material are prevented from bonding with the urethane and (b) the urethane permeates so as to surround the surface fibers 1. Due to this structure of (a) and (b), the contradictory properties of flexibility and peel strength of the coating layer are satisfied according to the present invention. Contrary to this, FIG. 3 shows the structure of a conventional windbreaker of a Comparative Example.

It is clear that the urethane 2 does not permeate into the inside of the fibrous substrate and bonds with the fibers 1 of the surface of the fibrous substrate 3. In such a structure, the flexibility and peel strength are largely governed by the degree of the bonding area of the fibers and urethane and the two above properties cannot be simultaneously satisfied.

Figure 2:
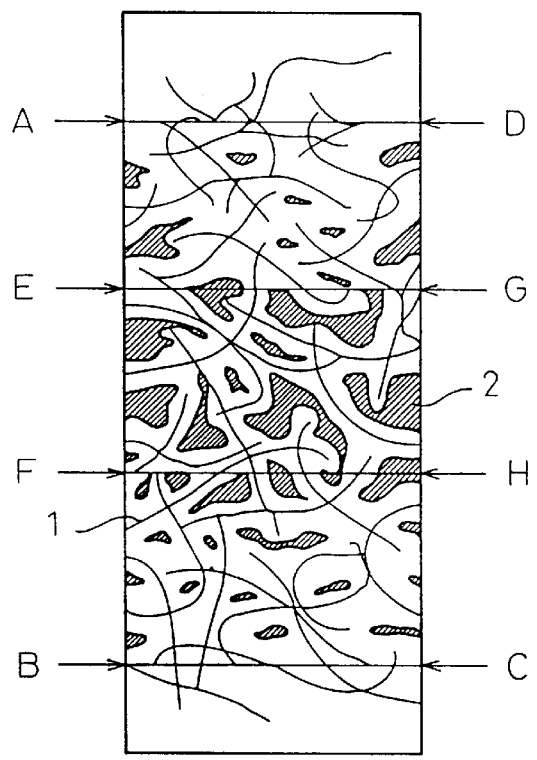
FIG. 2 is a cross-sectional schematic view of the structure of a composite material wherein the elastic polymeric substance 2 of the present invention is impregnated into the fibrous base material 3 (nonwoven fabric). In the drawing, the lines AD and BC show the positions of the surfaces of the fibrous base material. The region enclosed by the lines EG and FH shows the center portion of the fibrous base material.

FIG. 2 is a cross-sectional conceptual view of an artificial leather which is flexible and superior in wear resistance, obtained by impregnating a nonwoven fabric with a urethane, according to one example in the present invention.

From the figure, a structural feature of the composite material of the present invention is that a nonbonded structure of the fibers and urethane is formed and the rate of impregnation of the urethane at the center portion of the fibrous base material (region enclosed by the lines EG and FH) is higher than that at the surface portions (portions enclosed by the lines AD and EG and the lines FH and BC). Due to this, an elastic polymeric substance-impregnated composite material is obtained which is flexible and has excellent wear resistance, burst strength, tear strength, and other dynamic strength never before obtained in the past.

First, an explanation will be made of a composite material of the present invention comprised of a fibrous base material coated with an elastic polymeric substance (hereinafter referred to as a coated fabric).

As mentioned above, the coated fabric has a high peel strength despite the elastic polymeric substance not constraining the fibers and the fabric having a flexible feel.

The first feature of the coated fabric of the present invention is that the elastic polymeric substance permeates deeper than the fibers present at the interface of the fibrous base material and the elastic polymeric substance layer. When the coated elastic polymeric substance permeates deeper than the fibers present at the surface of the fibrous substrate on the side coated by the elastic polymeric substance (in other words, fibers present at the interface of the fibrous base material and the elastic polymeric substance layer), a high peel strength is obtained. Here, "deeply permeates" means there is a portion where the elastic polymeric substance penetrates to the extent of surrounding the fibers.

The degree to which the elastic polymeric substance surrounds the fibers in a nonbonding state is preferably at least 1 per 1000 $\mu$m distance in an electron micrograph. More preferably, it is at least 1 per 500 $\mu$m.

The second feature of the coated fabric of the present invention is the high nonbonding with the coating layer of the elastic polymeric substance by the fibers present at the interface of the coating layer of the elastic polymeric substance and the fibrous base material.

The present inventors have found that there is an extremely deep relationship between the degree of nonbonding with the elastic polymeric substance by the fibers present at the interface of the coating layer of the elastic polymeric substance and the fibrous base material and the flexibility of the coated fabric and the peel strength of the coating layer.

That is, it is necessary that the ratio Nn/Nt between the total number of fibers Nt present at the interface of the fibrous substrate and the coating layer of the elastic polymeric substance and the number of fibers Nn not bonded at all with the elastic polymeric substance on the circumference of the fiber cross-section among all the fibers present at the interface be 0.3 to 1, preferably 0.5 to 1.

When Nn/Nt is smaller than 0.3, the majority of the fibers are substantially bonded, so the feeling becomes unpreferably hard.

Here, Nn/Nt is calculated by the following method.

First, electron micrographs of the cross-section taken at any five positions of the coated fabric cut by a sharp blade and a magnification of 350× are divided into 500 micron units perpendicular to the surface of the coated fabric to obtain a large number of divided photographs. Any 10 of the divided photographs are extracted from among them. Next, the ratio Nn/Nt between the total number of fibers Nt present at the interface of the coating layer of the elastic polymeric substance and the fibrous substrate and the number of fibers Nn observed not to be contacted at all by the elastic polymeric substance on the circumference of the fiber cross-section among all the fibers present at the interface is calculated for each of the divided photographs and the average is found.

The thickness of the coating layer of the elastic polymeric substance referred to in the present invention is not particularly limited, but in the case of garment use is particularly preferably 1 to 500 $\mu$m. When the thickness is less than 1 $\mu$m, there is a danger of reduction of the hydrostatic pressure resistance in applications requiring water pressure resistance (for example, windbreakers and jackets). Further, when the thickness is more than 500 $\mu$m, the soft feeling of fibers is not caused, but rather a rubber-like feeling is obtained, and therefore, this is not preferable.

Next, an explanation will be made of the composite material of the present invention comprising a fibrous base material impregnated with an elastic polymeric substance (hereinafter referred to as the impregnated fabric).

The impregnated fabric of the present invention has as its first feature a high degree of nonbonding between the fibers in the fibrous base material and the elastic polymeric substance. That is, the ratio Nn/Nt between the total number of fibers Nt present in a cross-section of the sheet-like composite material and the number of fibers Nn not bonded at all with the elastic polymeric substance on the circumference of the fiber cross-section is 0.3 to 1.

The nonbonding between the elastic polymeric substance and the fibers is evaluated by counting the number Nn of the fibers not contacted at all by the elastic polymeric substance on the circumference of the fiber cross-section in an electron micrograph of a cross-section of the sheet-like composite material taken at a magnification of 350× and determining the ratio Nn/Nt with the total number of fibers Nt present in the cross-section. Nn/Nt is calculated in the following manner.

First, electron micrographs of the cross-section taken at any five positions of the coated fabric cut by a sharp blade and a magnification of 350× are divided into 100 micron units perpendicular to the surface of the sheet to obtain a large number of divided photographs. Any 10 of the divided photographs are extracted from among them. Next, the outermost surface is determined for each of the front and rear sides in the extracted photographs (corresponding to the top and bottom ends in FIG. 2) by the following method.

That is, ignoring the three fibers positioned the most outside, the centers of two fibers positioned at the outermost side and separated by at least 80 microns are connected by a line (line segment AD or line segment BC in FIG. 2). This is used as the outermost face. Next, the ratio Nn/Nt between the total number of fibers Nt present at the region enclosed by the outermost faces at the front and rear sides and the number of fibers Nn not contacted at all by the elastic polymeric substance on the circumference of the fiber cross-section is calculated for each of the divided photographs and the average is found.

Nn/Nt in the present invention is 0.3 to 1, preferably 0.5 to 1.

When Nn/Nt is less than 0.3, the majority of the fibers in the fibrous base material become bonded fibers, which is not preferable in that the feel becomes hard.

Next, the composite material impregnated with the elastic polymeric substance in the present invention has as its second feature the fact that the rate of impregnation of the elastic polymeric substance at the center portion is higher than the rate of impregnation of the elastic polymeric substance at the surface layer portions.

The surface layer portions and the center portion are defined by the following method. This will be explained using FIG. 2.

The surface layer portions of the composite material mean the regions enclosed by the line segment EC and the outermost face AD when the point positioned on the line segment AB a distance of ⅓ the distance of AB from A is made E and a point positioned on the line segment CD a distance ⅓ the distance of DC from D is made G. Note that the outermost face AD is the face of the front side of the sheet-like composite material. Further, the center portion means the region enclosed by the line segment FH and the line segment EG when the point positioned on the line segment AB a distance of ⅓ the distance of AB from B is made F and the point positioned on the line segment DC a distance of ⅓ the distance of DC from C is made H.

The ratio of the amount of impregnation of the surface layer portions and the center portion may be found by the following method. When the area of the elastic polymeric substance present at the surface layer portions in the divided photographs is Sa and the area of the elastic polymeric substance present at the center portion is Sb, it is possible to find the ratio Rs of the amount of impregnation of the surface portions and the center portion from the following equation:

$$Rs = Sa/Sb$$

To obtain a sufficient dynamic strength and obtain a flexible feel, Rs is preferably not more than 0.7. The rate of impregnation of the elastic polymeric substance is preferably about 5 to 40% by weight, based on the total weight of the sheet-like composite material, more preferably 10 to 30% by weight. The sheet-like composite material according to the present invention with this structure has an extremely flexible feel and has a low compression modulus near the surface, and therefore, has an extremely supple feel and has a high wear resistance, burst strength, and tear strength.

The fibrous base material used in the present invention means a spun yarn, multifilament, processed yarn, braid, and other yarn-like objects, paper, synthetic paper comprised of synthetic fiber, plain weaves, twill weaves, sateen weaves, and other woven fabrics, plain stitch, rib stitch, purl stitch, and other weft knits, single tricot knit or single atlas knit, single cord knit, half tricot knit, plain tricot knit, queen's cord knit, inleid net, and other warp knits, nonwoven fabrics obtained by treating a web, obtained by the dry method of webbing by the air lay method, card method, or flash method or the paper-making method of dispersing the fiber in water etc. and forming it on a metal net, by an entanglement method using the needle punch method, high speed fluid treatment, etc., thermal bond method, or chemical bond method, a split fabric obtained by tearing film, a composite of these nonwoven fabrics and woven fabrics or knitted fabrics, or a composite material of these fiber aggregates and a resin.

Among these, a plain weave is preferable in that it is low in cost too, but the warp and weft are generally tightly constrained, so a clearance cannot be obtained between filaments. In particular, at the time of coating, the urethane has trouble surrounding the fibers. Therefore, if mixed with partially crimped fiber or micro fiber (the fineness of not more than 1 denier), the situation is improved and the peel strength becomes larger, and therefore, this is preferable.

Further, as the nonwoven fabric used for the artificial leather, a paper-making nonwoven fabric obtained by applying a high speed fluid treatment to a sheet formed by webbing by the paper-making method has an extremely supple feel and, further, is superior in uniformity and isotropy of the fiber dispersion, so is excellent in the surface feel and has a good balance of physical properties in the weft and warp directions, so is preferable. Further, use of a nonwoven fabric comprising three-dimensionally entangled staple fibers of a filament diameter of 7 to 25 microns and a ratio L/D of the fiber length L and the filament diameter D of $0.8 \times 10^3$ to $2.0 \times 10^3$ and with a mean distance between entanglement points of the fibers of not more than 300 microns is preferable in terms of the wear resistance and burst strength.

The mean distance between fiber entanglement points used herein means the value measured by the following method known from Japanese Unexamined Patent Publication (Kokai) No. 58-191280 and is one measure for showing the degree of entanglement between fibers. The smaller the value, the denser the entanglement.

Further, as the constituent fibers, use may be made of natural fibers, regenerated fibers, polyester, polyamides, polyolefins, acrylic and other synthetic fibers, and split type fibers obtained by composite spun yarns etc., but the materials are not limited to these fibers.

As the elastic polymeric substance applied to the fibrous base material, use may be made of a polyester-based polyurethane, polyether-based polyurethane, polyester-polyether copolymer-based polyurethane, polycarbonate-based polyurethane, various synthetic rubbers, natural rubber and polymeric substances having rubbery elasticity, and mixtures comprised mainly of these. From the viewpoint of flexibility, use is preferably made of a polyurethane-based elastic polymeric substance.

Further, the composite material used in the present invention means a fiber/elastic polymer composite comprising the above-mentioned fibrous base material impregnated or coated, or both, with an elastic polymeric substance.

The composite material of the present invention comprising the above fibrous base material impregnated or coated with an elastic polymeric substance can be realized for the first time ever by formation of a sufficient nonbonded structure by the novel processes of production explained below.

That is, the biggest feature of the processes of production of the present invention is that the mold releasability of the fibrous base material and the elastic polymeric substance is improved in advance and a hydrophobic nature and hydrophilic nature are imparted, then wet solidification is performed. Further, it is also possible to perform dry solidification using a processing solution of the elastic polymeric substance dispersed in water of a partial emulsion system. As the water repellent silicone used in the hydrophobicizing pretreatment agent used in the present invention, use is made of, for example, dimethyl polysiloxane, alkyl-modified polysiloxane, hydrodiene-modified polysiloxane, amino-modified polysiloxane, epoxy-modified polysiloxane, and copolymer silicones of the same. Among these, methylhydrodiene polysiloxane and a copolymer of dimethyl polysiloxane and methylhydrodiene polysiloxane are preferred due to their high hydrophobicizing effect on the surface of the fibers. As the hydrophobic pretreatment agent, in addition to the above-mentioned water repellent silicone, use may also be made, together or alone, of a known water repellent such as a fluorine-based water repellent comprised of a copolymer of acrylate or methacrylate derived from a perfluoroalkyl compound and a vinyl compound. In this case, the higher the ratio of the fluorine-based water repellent, the more the permeation of the elastic polymeric substance in the fibrous substrate is suppressed. In particular, when coating a thin woven fabric in which the substance is liable to leak through to the back (weight of not more than 100 $g/m^2$) by knife coating or the like in high liquid pressure, it is preferable to use the fluorine-based water repellent alone and not use silicone since trouble such as the deposition of the elastic polymeric substance on the back roll can be suppressed.

The amount of deposition of the water repellent silicone and fluorine-based water repellent with respect to the fibrous base material is preferably 0.1 to 2% by weight based upon the weight of the fibers. More preferably it is 0.3 to 1% by weight. When the amount of deposition is less than 0.1% by weight, the bonding preventing effect caused by the repulsion action of the hydrophobic nature and hydrophilic nature with the elastic polymeric substance later impregnated is small. On the other hand, when the amount of deposition is more than 2% by weight, the amount becomes excessive and not only is waste caused, but also, when the amount is 5% by weight or more, there is the danger of uneven dyeing at the time of dyeing.

However, in the present invention, when a hydrophobicizing pretreatment agent mainly comprising a water repellent silicone is applied to the fibrous base material, a reduction in the strength of the fibrous base material is sometimes caused when the fibrous base material is a nonwoven fabric obtained by entanglement of staple fibers. In this case, it is preferable to concurrently use a water repellent silicone and paste polymeric substance or anti-slip agent for the hydrophobic pretreatment agent.

The anti-slip agent added to the hydrophobic pretreatment agent used in the present invention means an ordinarily used anti-slip agent such as one of a colloidal silica base, silicone base, inorganic oxide base, paraffin base, or ester base. From the viewpoint of the flexibility, a silicone-based anti-slip agent is preferable. For example, use is preferably made of the product BY22-839 made by Toray-Dow Corning Silicone Co., Ltd.

As the hydrophilic silicone added to the elastic polymeric substance used in the present invention, use is made of, for example, an alkoxy-modified polysiloxane, a carboxy-modified polysiloxane, copolymers of the same, and copolymers of these with dimethyl polysiloxane and other alkyl polysiloxanes. Among these, methylethoxy polysiloxane and other alkylalkoxy polysiloxanes are preferable in that they give a greater hydrophilic nature to the elastic polymeric substance.

The amount of the hydrophilic silicone added to the elastic polymeric substance is preferably 0.1 to 10% by weight. When the amount of addition is less than 0.1% by weight, the bonding preventing effect caused by the repulsion action of the hydrophobic nature and hydrophilic nature with the constituent fibers of the nonwoven fabric is small. On the other hand, even when the amount of addition is greater than 10% by weight, there is no difference in the bonding preventing effect, and therefore, waste is caused. Further, there is the problem that the foamability of the impregnated elastic polymeric substance at the time of wet solidification becomes poor. Also, as the secondary components, use may be made concurrently of the ordinarily used sorbitan base, polyoxyethylene base, or other hydrophilicizing agents.

The reason why the bonding preventing effect of the fibers and elastic polymeric substance is extremely high in the processes of production according to the present invention is believed to be the synergistic action of the following two mechanisms:

(i) The fibers and elastic polymeric substance are each improved in the mold releasability by the unique lubricating property of silicone or the fluorine-based water repellent.

(ii) The surface of the fibers is made hydrophobic and the elastic polymeric substance is made hydrophilic, and therefore, a repulsion action acts at the time of wet solidification and cavities are formed positively between the fibers and elastic polymeric substance.

With just improving the mold releasability of the fibers and elastic polymeric substance as in the known methods, the fibers and elastic polymeric substance are still bonded at the time of wet solidification and it is necessary to apply some physical mold release work, such as repeated flexing. Even with repeated flexing, sufficient mold release may not be possible. It is not possible to obtain a flexibility such as with the case of preventing bonding of the elastic polymeric substance and fibers from the time of the wet solidification as in the structure obtained by the present invention.

Figure 4A:
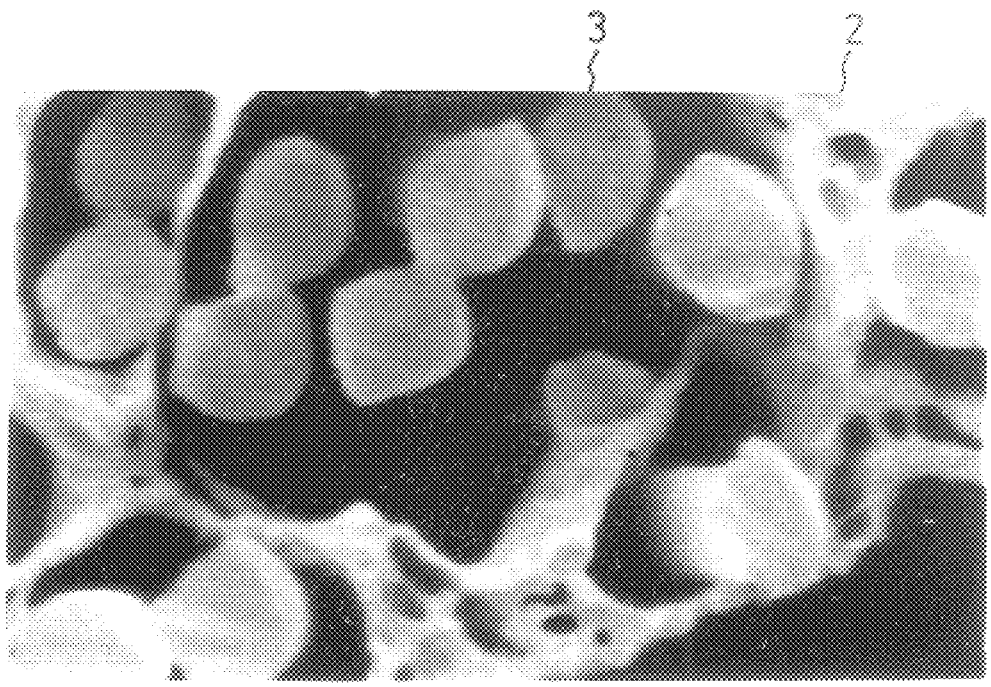
Figure 4B:
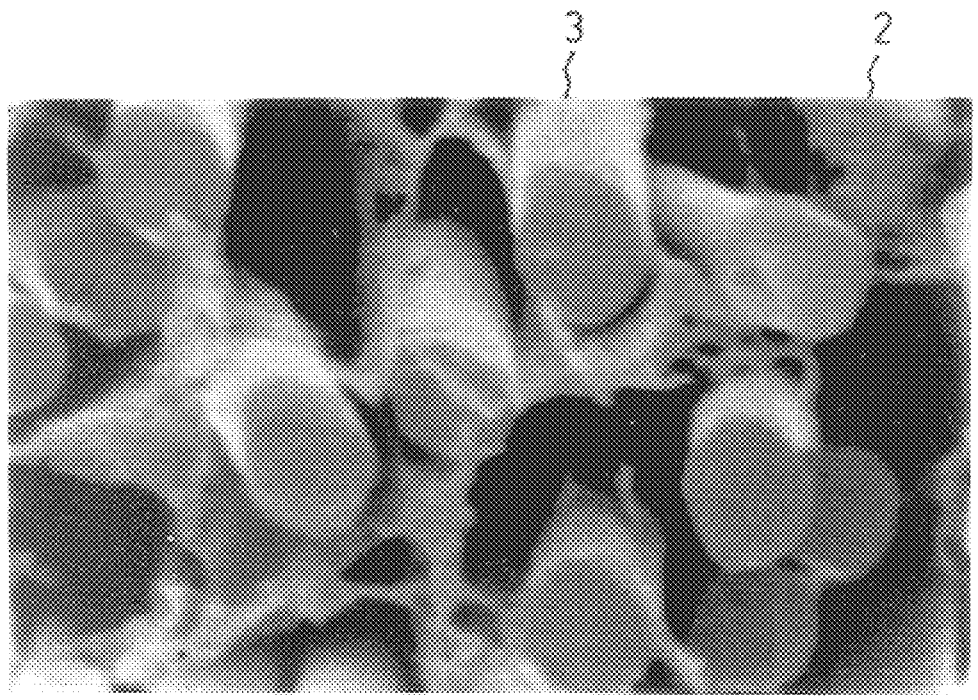
FIG. 4(b) is an electron micrograph (2500X) of part of the cross-section of a composite material of a Comparative Example prepared by Comparative Example 10 of the prior art. In this drawing, 2 is an elastic polymeric substance and 3 is a fiber of the fibrous base material.

The electron micrograph of FIG. 4(a) shows a composite material obtained by impregnating an elastic polymeric substance as obtained in Example 7 of the present invention. It is clear that the space is formed between the elastic polymeric substance and the fibrous base material and that an excellent nonbonded structure is obtained. As is opposed to this, FIG. 4(b) shows an electron micrograph of a cross-section of a composite material of the prior art (see Comparative Example 10) in which only the fibrous base material is given a water repellent silicone pretreatment and hydrophilic silicone is not added to the elastic polymeric substance. As is clear from the figure, the elastic polymeric substance and the fibrous base material bond and the feel becomes hard.

Note that a solution viscosity at the time of coating the elastic polymeric substance having a solution viscosity of 2000 to 100,000 cps is a feature of the composite material of the present invention. This is preferable in that the elastic polymeric substance deeply enters into the fibrous base material and a coating layer of the elastic polymeric substance is easily formed at the surfaces of the fibrous base material.

Further, the viscosity at the time of impregnation of the elastic polymeric substance is preferably not more than 50,000 cps.

Further, as the method of coating the fibrous base material with a solution or emulsion of an elastic polymeric substance, use is made of the system of coating directly on a woven fabric by a roll coater or knife coater or coating on a mold release paper etc. and superposing a woven fabric to transfer the same.

Further, in the composite material of the present invention, a structure in which the nonbonded structure of the elastic polymeric substance and the fiber spreads and the rate of impregnation of the elastic polymeric substance at the center portion is higher than that at the surface layer portions is achieved by the following production process.

That is, the production process is characterized by pretreating the fibrous base material in advance with a treatment solution composed primarily of the paste polymeric substance and water repellent silicone and drying, impregnating and solidifying an elastic polymeric substance in which the same above mentioned hydrophilic silicone is added, then extracting and removing the paste polymeric substance.

The paste polymeric substance is preferably a polymeric substance which can dissolve in a solvent different from the solvent of the elastic polymeric substance later impregnated. For example, use may be made of polyvinyl alcohol, carboxymethylcellulose, polyvinyl acetate, or starch. In particular, polyvinyl alcohol and carboxymethylcellulose are preferable in that they are soluble in water and are easy to extract. The solid content deposition of the paste polymeric substance on the fibers is preferably from 0.5 to 15% by weight, more preferably 2 to 7% by weight. When the solid content deposition is less than 0.5% by weight, even if the paste polymeric substance concentrates at the surface of the fibrous base material by migration, it is not possible to fill in the cavities between fibers much at all, and therefore, the later impregnated elastic polymeric substance is impregnated in the same way at both the surface layer portions and center portion, and therefore, this is not preferable. Also, a sufficient binding effect is not exhibited and changes in shape etc. occur in the later processes.

On the other hand, when the deposition of the paste polymeric substance is greater than 15% by weight, almost all the cavities between fibers at the surface portions of the fibrous base material are filled in due to the migration of the paste polymeric substance, and therefore, permeation of the elastic polymeric substance becomes difficult.

The impregnated water repellent silicone and paste polymeric substance exhibit unique behaviors in the drying process. The paste polymeric substance deposits at the surface portions of the fibrous base material selectively due to migration and acts as a binder which binds at the fiber entanglement points so as to remarkably improve the shape stability of the fibrous base material. At the same time, it selectively fills the cavities at the surface layer portions of the fibrous base material, and therefore, the ratio of presence of the next impregnated elastic polymeric substance at the surface layer portions can be made lower than that at the center portion.

Next, by extracting the paste polymeric substance, a nonbonded structure of the fiber and elastic polymeric substance is realized at the surface layer portions. On the other hand, the water repellent silicone is more resistant to migration than the paste polymeric substance, so is present in greater amounts at the center portion. Accordingly, at the center portion, a nonbonded structure is realized by the repulsion action caused by the water repellency/hydrophilic nature between the water repellent silicone present at the fiber surfaces and the hydrophilic silicone present in the impregnated urethane.

The most important feature of the production process of the present invention is that the pretreatment and drying are performed by a treatment solution comprising mainly a paste polymeric substance and a water repellent silicone. When the paste polymeric substance and the water repellent silicone are separately used to treat the fibrous substrate (for example, depositing and drying the paste polymeric substance, then applying the water repellent silicone), sufficient deposition of the paste on the surface is inhibited or the fibrous substrate changes remarkably in shape, and therefore, this is not preferred.

The elastic polymeric substance impregnated fabric or coated fabric obtained by the production process of the present invention is extremely flexible and does not suffer from a reduction of the feeling of volume or the feel of the fibrous substrate. In addition, the elastic polymeric substance imparted to the inside of the fibrous substrate is present in the continuous spaces created in the fibrous substrate, and therefore, there is also no reduction in the wear resistance, burst strength, or other dynamic strength.

Accordingly, when, for example, copper or silver thread or other antibacterial agents or deodorizing agents, zirconium carbide or other heat storage agents, or other high performance particles are added inside the elastic polymeric substance, durability in wearing and durability in washing are obtained and the material may be applied to a wide range of applications other than garments, for example, shoe materials, furniture, and medical applications as a flexible high performance processed fabric.

Further, of course, when the functional particles are treated in advance by the hydrophobicizing pretreatment agent of the present invention, the functional particles and elastic polymeric substance easily form a nonbonded structure and even if a large amount of functional particles are added, no deterioration in the strength or reduction in the flexibility are caused, and therefore, this is desirable. Further, this is preferable in that, since there is air permeability and moisture absorption, the functions of functional particles (for example, antibacterial property or moisture retention) are easily exhibited.

The coated fabric having this structure is flexible and on top of that has an extremely high peel strength and is moisture permeable and waterproof as well, so in particular is optimal for sportswear applications such as ski wear, golf and jogging windbreakers, etc.

Further, the objects of the present invention are achieved even if cellulose, collagen, or other functional particles are added to the elastic polymeric substance for the purpose of improvement of the feel, moisture permeability, or dewing prevention or a water repellent is added for the purpose of improvement of the water pressure resistance.

EXAMPLES

Examples of the present invention will be given below. In the following Examples, all quantities, unless specifically stated to the contrary, are based on weight.

Further, the measurements shown in the Examples were measured according to the following:

(a) Bending hardness
  According to the KES (Kawabata Evolution System) net flexing test. The smaller the value, the more flexibility indicated.
(b) Wear resistance
  According to the JIS-Z-1096 taper method. This is performed by a wear ring H-22 and a 1 kg load. The number of times of wear until a hole is formed in the test piece is used as the wear resistance.
(c) Peel strength
  According to JIS K-6328
(d) hydrostatic pressure resistance
  According to JIS L-1096
(e) Shrinkage rate
  Calculated by the following method:
    $L_1$: Initial length
    $L_2$: Length after immersion in water and drying at 100° C. for 3 minutes
      Shrinkage rate $(\%)=(L_1-L_2)/L_1 \times 100$
(f) Moisture permeability
  According to JIS L-1099
(g) Noisiness
  Windbreakers were fabricated and the noisiness was evaluated organoleptically by a wearing test (wearing for one day) by 10 people. Each person was asked to evaluate the noisiness by giving one point when it did not bother him or her at all and 0 point when it bothered him or her with each movement. One half of the total points was used as the grade.
(h) Surface feel
  o: Very supple feel∩∩∩∩∩∩∩∩∩∩∩
  Δ: Supple feel
  x: Paper-like feel Further, the abbreviations used in the tables are as follows:
MHSiO: Methylhydrodiene polysiloxane
MESiO: Methylethoxy polysiloxane
PVA: Polyvinyl alcohol
PU: Polyurethane

Example 1

Nylon fibers of a filament denier of 1.5d and a fiber length of 12.5 mm were made into a sheet by the paper-making method. Next, high speed fluid treatment was performed for three-dimensional entanglement to produce a nonwoven fabric with a weight of 360 g/m² and a thickness of 1.2 mm. This was immersed in a pretreatment solution prepared from 0.6 part of dimethyl polysiloxane, 5 parts of PVA, and 94.4 parts of water, then nip rolls were used to uniformly so that the weight of the above solution is 100% to the weight of the fabric. The fabric was then dried at 150° C. for 3 minutes in a hot air dryer. By this, the dimethyl polysiloxane effective ingredient was deposited on the nonwoven fabric in an amount of 0.6% by fiber weight and the PVA effective ingredient in an amount of 5% by fiber weight.

Next, a polyurethane solution composed of 11 parts of polyurethane having a polyester-ether copolymer-based soft segment, 1 part of methylethoxy polysiloxane, and 88 parts of dimethylformamide was impregnated in the above-mentioned pretreated nonwoven fabric. This was wrung for a wringing rate of 250%, was made to solidify in water for 6 minutes, was placed in hot water of 90° C. to 100° C. to decompose and remove the PVA, then was dried. The resultant sheet-like composite material had a high Nn/Nt of 0.66, so the bending hardness was low and the material was flexible. Further, the Rs was a low 0.33 and the amount of impregnation was higher in the center portion than the surface layer portions, so there was a high wear resistance, it was learned. These properties are shown in Table 1 and Table 2.

Example 2

The nonwoven fabric of Example 1 was immersed in a pretreatment solution prepared from 0.6 part of dimethyl polysiloxane, 2 parts of PVA, and 97.4 parts of water, then nip rolls were used to uniformly wring it for a wringing rate of 100%. The fabric was then dried at 150° C. for 3 minutes in a hot air dryer. By this, the dimethyl polysiloxane effective ingredient was deposited on the nonwoven fabric in an amount of 0.6% by fiber weight and the PVA effective ingredient in an amount of 2% by fiber weight.

Next, a polyurethane solution composed of 11 parts of polyurethane having a polyester-ether copolymer-based soft segment, 1 part of methylethoxy polysiloxane, and 88 parts of dimethylformamide was impregnated in the above-mentioned pretreated nonwoven fabric. This was wrung for a wringing rate of 250%, was made to solidify in water for 6 minutes, was placed in hot water of 90° C. to 100° C. to decompose and remove the PVA, then was dried. The resultant sheet-like composite material had a high Nn/Nt of 0.54 so the bending hardness was low and the material was flexible. Further, the Rs was a low 0.37 and the amount of impregnation was higher in the center portion than the surface layer portions, so there was a high wear resistance, it was learned. These properties are shown in Table 1 and Table 2.

Comparative Example 1

The nonwoven fabric of Example 1 was immersed in a pretreatment solution prepared from 0.6 part of dimethyl polysiloxane and 99.4 parts of water, then nip rolls were used to uniformly wring it out for a wringing rate of 100%. The fabric was then dried at 150° C. for 3 minutes in a hot air dryer. By this, the dimethyl polysiloxane effective ingredient was deposited on the nonwoven fabric in an amount of 0.6% by fiber weight.

Next, a polyurethane solution comprising 11 parts of polyurethane having a polyester-ether copolymer-based soft segment, 1 part of methylethoxy polysiloxane, and 88 parts of dimethylformamide was impregnated in the above-mentioned pretreated nonwoven fabric. This was wrung for a wringing rate of 250%, was made to solidify in water for 6 minutes, was washed in hot water of 90° C. to 100° C., then was dried. The resultant sheet-like composite material had a high Nn/Nt of 0.55 so the bending hardness was low and the material was flexible, but the Rs was 1.12, that is, the elastic polymeric substance was impregnated uniformly in the thickness direction, so the high wear resistance of Examples 1 and 2 could not be obtained. These properties are shown in Table 1 and Table 2.

Comparative Example 2

The nonwoven fabric of Example 1 was immersed in a pretreatment solution prepared from 3 parts of PVA and 97 parts of water, then nip rolls were used to uniformly wring it out for a wringing rate of 100%. The fabric was then dried at 150° C. for 3 minutes in a hot air dryer. By this, the PVA effective ingredient was deposited on the nonwoven fabric in an amount of 3% by fiber weight.

Next, a polyurethane solution composed of 11 parts of polyurethane having a polyester-ether copolymer-based soft segment and 89 parts of dimethylformamide was impregnated in the above-mentioned pretreated nonwoven fabric. This was wrung for a wringing rate of 250%, was made to solidify in water for 6 minutes, was placed in hot water of 90° C. to 100° C. to decompose and remove the PVA, then was dried. The resultant sheet-like composite material had a low Nn/Nt of 0.18 so the bending hardness was high and the feel was hard, it was learned. These properties are shown in Table 1 and Table 2.

Comparative Example 3

The nonwoven fabric of Example 1 was impregnated with a polyurethane solution composed of 11 parts of polyurethane having a polyester-ether copolymer-based soft segment and 89 parts of dimethylformamide. This was wrung for a wringing rate of 250%, was made to solidify in water for 6 minutes, was washed in hot water of 90° C. to 100° C., then was dried. The resultant sheet-like composite material was extremely hard and the feel of the surface was paper-like. These properties are shown in Table 1 and Table 2.

Example 3

A plain weave of 66 nylon fiber (taffeta) was immersed in a pretreatment solution prepared from 1 part of a copolymer silicone composed of about 55% methylhydrodiene siloxane and about 45% dimethyl siloxane and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the fabric in an amount of 0.6%.

Next, a polyurethane solution composed of 20 parts of polyurethane having a polyester-ether copolymer-based soft segment, 2 parts of a copolymer silicone composed of about 60% of methylethoxy siloxane and about 40% of dimethyl siloxane, that is, methylethoxy polysiloxane, 78 parts of dimethylformamide, 1.2 parts of a fluorine-based water repellent, and 10 parts of cellulose particles (made by Asahi Chemical Industry Co., Ltd., product name: Abicell PH-MD6, mean particle size 6 $\mu$m) was coated on the above-mentioned pretreated woven fabric by a knife coater to give 200 g/m$^2$, then was caused to solidify in water for 6 minutes, then was washed in warm water of 60° C. to 70° C. for 20 minutes and dried. Further, the fluorine-based water repellent was made to deposit in a net amount of about 0.3 g/m$^2$ by the immersion method. The flexural modulus and the peel strength of the resultant sheet-like composite material are shown in Table 3. The Nn/Nt of the sheet-like composite material of the present invention was a high 0.83, so the flexural modulus was a low 0.30. Compared with a material with no treatment of either the fibrous base material or the elastic polymeric substance (see Comparative Example 4), the material was found to be extremely flexible. The peel strength, further, was 1500 gf/inch, which was extremely high compared with the fluorine-based water repellent treated and calendered material (Comparative Example 5).

Further, windbreakers were fabricated and worn for one day by 10 people to evaluate the noisiness. As a result, when a windbreaker prepared in Example 3 was worn, the noisiness did not bother the 10 people much at all, so a grade of 5 was given. As opposed to this, in the later mentioned Comparative Example 4, 10 out of 10 people and in Comparative Example 5, six out of 10 people were bothered by the noisiness.

From Table 3, further, it is learned that the material had water pressure resistance and moisture permeability and was superior for a windbreaker.

Comparative Example 4

The pretreated fabric of Example 3 was coated with a polyurethane solution composed of 20 parts of polyurethane having a polyester-ether copolymer-based soft segment and 80 parts of dimethylformamide by a knife coater to give 200 g/m$^2$, then was caused to solidify in water for 6 minutes, then was washed in warm water of 60° C. to 70° C. for 20 minutes and was dried. Further, a fluorine-based water repellent was made to deposit in a net amount of about 0.3 g/m² by the immersion method. The flexural modulus and the peel strength of the resultant sheet-like composite material are shown in Table 3. The peel strength of the sheet-like composite material was an extremely high 1650 gf/inch. However, the Nn/Nt was a low 0.11, so the flexural modulus was a high 0.67 and the feel was hard compared with the one of the present invention shown in Example 3.

Comparative Example 5

The fabric of Example 3 was treated for water repellency using a 2% aqueous solution of a fluorine-based water repellent. Next, this was subjected to hot calendering under conditions of a temperature of 160° C. and a linear pressure of 130 kg/cm so as to smooth the surface.

The fabric was coated with a polyurethane solution composed of 20 parts of polyurethane having a polyesterether copolymer-based soft segment and 80 parts of dimethylformamide by a knife coater to give 200 g/m², then was dried. The flexural modulus and the peel strength of the resultant sheet-like composite material are shown in Table 3. The soaking by urethane was suppressed, so compared with Comparative Example 1, the Nn/Nt of the sheet-like composite material was a high 0.20, so the flexural modulus was a low 0.48 and the feel was flexible, but the peel strength was 700 gf/inch, which was low compared with Example 3.

Example 4

A plain weave of 66 nylon fiber (taffeta) was immersed in a hydrophobicizing pretreatment solution prepared from 1 part of a copolymer silicone comprised of about 55% methylhydrodiene siloxane and about 45% dimethyl siloxane, that is, methylhydrodiene polysiloxane, and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the fabric in an amount of 0.6%.

Next, a polyurethane solution composed of 11 parts of polyurethane having a polyester-ether copolymer-based soft segment, 1 part of a copolymer silicone comprised of about 60% of methylethoxy siloxane and about 40% of dimethyl siloxane, that is, methylethoxy polysiloxane, and 88 parts of dimethylformamide was impregnated in the above-mentioned hydrophobicizing pretreated woven fabric, which was then wrung for a wringing rate of 150%.

Next, this was caused to solidify in water for 6 minutes, then was washed in warm water of 60° C. to 70° C. for 20 minutes and was dried.

The flexural modulus of the resultant sheet-like composite material is shown in Table 4. The flexural modulus of the sheet-like composite material obtained in the present invention was a low 0.017, and therefore, the material was found to be extremely flexible compared with one where the fiber base material was treated for water repellency (see Comparative Example 6) and one in which the fibrous substrate and the elastic polymeric substance were both not treated at all (see Comparative Example 7).

Example 5

A plain stitch tubular knitted fabric made using ester fibers was immersed in a hydrophobicizing pretreatment solution prepared from 1 part of a copolymer silicone of about 55% methylhydrodiene siloxane and about 45% of dimethyl siloxane, that is, methylhydrodiene polysiloxane, and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the knitted fabric in an amount of 0.6%.

Next, a polyurethane solution composed of 11 parts of polyurethane having a polyester-ether copolymer-based soft segment, 1 part of a copolymer silicone of about 60% of methylethoxy siloxane and about 40% of dimethyl siloxane, that is, methylethoxy polysiloxane, and 88 parts of dimethylformamide was impregnated in the above-mentioned pretreated knitted fabric. This was wrung for a wringing rate of 150%, was made to solidify in water for 6 minutes, was washed in warm water of 60° C. to 70° C. for 20 minutes, then was dried.

The flexural modulus of the resultant sheet-like composite material is shown in Table 5. The flexural modulus of the sheet-like composite material obtained in the present invention was a low 0.020, which means the material was extremely flexible compared with one where the fibrous base material was treated for water repellency (see Comparative Example 8) and one where the fibrous substrate and the elastic polymeric substance were not treated at all (see Comparative Example 9).

Example 6

The knitted fabric obtained in Example 5 was immersed in a hydrophobicizing pretreatment solution prepared from 1 part of a copolymer silicone of about 55% methylhydrodiene siloxane and about 45% of dimethyl siloxane, that is, methylhydrodiene polysiloxane, 5 parts of PVA, and 94 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the knitted fabric in an amount of 0.6% and the PVA effective ingredient in an amount of 3%.

Next, a polyurethane solution composed of 11 parts of polyurethane having a polyester-ether copolymer-based soft segment, 1 part of a copolymer silicone of about 60% of methylethoxy siloxane and about 40% of dimethyl siloxane, that is, methylethoxy polysiloxane, and 88 parts of dimethylformamide was impregnated in the above-mentioned pretreated knitted fabric. This was wrung for a wringing rate of 150%, was made to solidify in water for 6 minutes, was placed in hot water of 90° C. to 100° C. to decompose and remove the PVA, then was dried.

The flexural modulus of the resultant sheet-like composite material is shown in Table 5. The flexural modulus of the sheet-like composite material of the present invention was a low 0.023, which means the material was extremely flexible compared with one where the fibrous base material was treated for water repellency (see Comparative Example 8) and one where the fibrous substrate and the elastic polymeric substance were not treated at all (see Comparative Example 9). Further, the pretreated fibrous substrate had an extremely excellent shape stability at the time of processing due to the binding effect of the PVA.

Example 7

Nylon fibers of a filament denier of 1.5d and a fiber length of 12.5 mm were made into a web by the paper-making method. Next, high speed fluid treatment was performed for three-dimensional entanglement to produce a nonwoven fabric with a weight of 360 g/m² and a thickness of 1.2 mm. This was immersed in a hydrophobicizing pretreatment solution prepared from 1 part of a copolymer silicone of approximately 55% methylhydrodiene siloxane and approximately 45% dimethyl siloxane, that is, methylhydrodiene polysiloxane, and 99 parts of water, then nip rolls were used to uniformly wring it out for a wringing rate of 100%. The fabric was then dried at 150° C. for 3 minutes in a hot air dryer. By this, the methylhydrodiene polysiloxane effective ingredient was deposited on the nonwoven fabric in an amount of 1%.

Next, a polyurethane solution composed of 11 parts of polyurethane having a polyester-ether copolymer-based soft segment, 1 part of a copolymer siloxane comprised of about 60% of methylethoxy siloxane and about 40% of dimethyl siloxane, that is, methylethoxy polysiloxane, and 88 parts of dimethylformamide was impregnated in the above-mentioned pretreated nonwoven fabric. This was wrung for a wringing rate of 250%, was made to solidify in water for 6 minutes, was washed by warm water of 60° C. to 70° C. for 20 minutes, then was dried.

The flexural modulus of the resultant sheet-like composite material is shown in Table 6. The one obtained in the present invention was a low 1.05, which means the material was extremely flexible compared with one where the fibrous base material was treated for water repellency (see Comparative Example 10) and one where the fibrous base material and the elastic polymeric substance were not treated at all (see Comparative Example 11).

Example 8

The nonwoven fabric obtained in Example 7 was immersed in a hydrophobicizing pretreatment solution prepared from 1 part of a copolymer silicone of about 55% methylhydrodiene siloxane and about 45% of dimethyl siloxane, that is, methylhydrodiene polysiloxane, 5 parts of PVA, and 94 parts of water, then nip rolls were used to uniformly wring it out for a wringing rate of 100%. The fabric was then dried at 150° C. for 3 minutes in a hot air dryer. By this, the methylhydrodiene polysiloxane effective ingredient was deposited on the nonwoven fabric in an amount of 1% and the PVA effective ingredient in an amount of 5%.

Next, a polyurethane solution composed of 11 parts of polyurethane having a polyester-ether copolymer-based soft segment, 1 part of a copolymer silicone of about 60% of methylethoxy siloxane and about 40% of dimethyl siloxane, that is, methylethoxy polysiloxane, and 88 parts of dimethylformamide was impregnated in the above-mentioned pretreated nonwoven fabric. This was wrung for a wringing rate of 250%, was made to solidify in water for 6 minutes, was placed in hot water of 90° C. to 100° C. to decompose and remove the PVA, then was dried.

The flexural modulus of the resultant sheet-like composite material is shown in Table 6. The flexural modulus of the composite material obtained in the present invention was a low 1.21, which means the material was extremely flexible compared with one where the fibrous base material was treated for water repellency (see Comparative Example 10) and one where the fibrous substrate and the elastic polymeric substance were not treated at all (see Comparative Example 11). Further, the pretreated fibrous base material had an extremely excellent shape stability at the time of processing due to the binding effect of the PVA.

Example 9

The nonwoven fabric obtained in Example 7 was immersed in a hydrophobicizing pretreatment solution prepared from 1 part of a copolymer silicone composed of about 55% methylhydrodiene siloxane and about 45% of dimethyl siloxane, that is, methylhydrodiene polysiloxane, 0.2 part of an anti-slip agent BY22-839 (made by Toray-Dow Corning, effective ingredient 20%), and 98.8 parts of water, then nip rolls were used to uniformly wring it out for a wringing rate of 100%.

The fabric was then dried at 150° C. for 3 minutes in a hot air dryer. By this, the methylhydrodiene polysiloxane effective ingredient was deposited on the nonwoven fabric in an amount of 1% and the anti-slip agent effective ingredient in an amount of 0.04%.

Next, a polyurethane solution comprised of 11 parts of polyurethane having a polyester-ether copolymer-based soft segment, 1 part of a copolymer silicone comprised of about 60% of methylethoxy siloxane and about 40% of dimethyl siloxane, that is, methylethoxy polysiloxane, and 88 parts of dimethylformamide was impregnated in the above-mentioned pretreated nonwoven fabric. This was wrung for a wringing rate of 250%, was made to solidify in water for 6 minutes, was washed in warm water of 60° C. to 70° C. for 20 minutes, then was dried.

The flexural modulus of the resultant sheet-like composite material is shown in Table 6. The one obtained in the present invention was a low 1.33, which means the material was extremely flexible compared with one where the fibrous substrate was treated for water repellency (see Comparative Example 10) and one where the fibrous base material and the elastic polymeric substance were not treated at all (see Comparative Example 11). Further, the pretreated fibrous base material had an extremely excellent shape stability at the time of processing due to the effect of the anti-slip agent.

Example 10

Wool 48 count two-ply yarns were immersed in a hydrophobicizing pretreatment solution prepared from 1 part of a copolymer silicone that is, methylhydrodiene polysiloxane, composed of about 55% methylhydrodiene siloxane and about 45% dimethyl siloxane, and 99 parts of water, then were uniformly spun dry by a centrifugal dryer for a wringing rate of 60%, and were dried at 150° C. for 3 minutes in a hot air dryer, so as to deposit on the two-ply yarns the methylhydrodiene polysiloxane effective ingredient in an amount of 0.6%.

Next, a polyurethane solution composed of 11 parts of polyurethane having a polyester-ether copolymer-based soft segment, 1 part of a copolymer silicone comprised of about 60% of methylethoxy siloxane and about 40% of dimethyl siloxane, that is, methylethoxy polysiloxane, and 88 parts of dimethylformamide was impregnated in the pretreated two-ply yarns, which were then wrung for a wringing rate of 150%, caused to solidify in water for 6 minutes, then washed in warm water of 60° C. to 70° C. for 20 minutes, then dried.

The flexural modulus and peel strength of the resultant impregnated yarn composite material are shown in Table 7. The flexural modulus of the impregnated yarns obtained in the present invention was a low 1.32 gfcm²/100 yarns, and therefore, the material was found to be extremely flexible compared with one in which the fibrous base material and the elastic polymeric substance were both not treated at all (see Comparative Example 13). Further, the shrinkage rate was low compared with the untreated original yarns and so it was learned there was an anti-shrinking effect.

Example 11

The woven fabric obtained in Example 4 was immersed in a hydrophobicizing pretreatment solution prepared from 1 part of a copolymer silicone composed of about 55% methylhydrodiene siloxane and about 45% dimethyl siloxane, that is, methylhydrodiene polysiloxane, and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the fabric in an amount of 0.6%.

Next, a polyurethane solution composed of 20 parts of polyurethane having a polyester-ether copolymer-based soft segment, 2 parts of a copolymer silicone comprised of about 60% of methylethoxy siloxane and about 40% of dimethyl siloxane, that is, methylethoxy polysiloxane, and 78 parts of dimethylformamide was coated on the pretreated fabric by a knife coater to give 500 g/m$^2$, then the fabric was caused to solidify in water for 6 minutes, then was washed in warm water of 60° C. to 70° C. for 20 minutes, then dried.

The flexural modulus and peel strength of the resultant sheet-like composite material are shown in Table 7.

The flexural modulus of the sheet-like composite material of the present invention was a low 0.53 and therefore the material was found to be extremely flexible compared with one where the fiber substrate was treated for water repellency (see Comparative Example 14) and one in which the fibrous substrate and the elastic polymeric substance were both not treated at all (see Comparative Example 15). Further, the peel strength was 1500 gf/inch, which is extremely high compared with the fluorine-based water repellent treated and calendered material (Comparative Example 16).

Example 12

Taffeta (weight of 40 g/m$^2$) made using multifilaments (50$^d$/100$^f$) of nylon 66 micro fibers of a denier of 0.5d as the warp and multifilaments (70$^d$/70$^f$) of regular nylon 66 fiber having a denier of 1d as the weft was immersed in a hydrophobicizing pretreatment solution prepared from 3 parts of a perfluoroacrylic-based fluorine-based water repellent (made by Meisei Chemical Co., AG710) and 97 parts of water, then nip rolls were used to uniformly wring it out for a wringing rate of 60%. The fabric was then dried at 150° C. for 3 minutes in a hot air dryer. By this, the fluorine-based water repellent effective ingredient was deposited on the fabric in an amount of 0.30% by solid content.

Next, a polyurethane solution composed of 20 parts of polyurethane having a polyester-ether copolymer-based soft segment, 2 parts of a copolymer silicone comprised of about 60% of methylethoxy siloxane and about 40% of dimethyl siloxane, that is, methylethoxy polysiloxane, and 78 parts of dimethylformamide was coated on the above-mentioned pretreated fabric by a knife coater at a coverage of 500 g/m$^2$. This was caused to solidify in water for 6 minutes, then was washed in warm water of 60° C. to 70° C. for 20 minutes, then dried. During coating, there was no leakage of urethane solution to the rear and the processability was good.

The flexural modulus and peel strength of the resultant sheet-like composite material are shown in Table 8.

The flexural modulus of the sheet-like composite material of the present invention was a low 0.45 and therefore the material was found to be extremely flexible compared with one where the fiber substrate was treated for water repellency (see Comparative Example 14) and one in which the fibrous substrate and the elastic polymeric substance were both not treated at all (see Comparative Example 15). Further, the peel strength was 2000 gf/inch, which is extremely high compared with the fluorine-based water repellent treated and calendered material (Comparative Example 16). This is considered to be because the urethane permeates and surrounds in a nonbonding state the 0.5d fine denier nylon 6 fibers. This was confirmed by an electron microscope.

Example 13

A plain weave of 66 nylon fiber (taffeta) was immersed in a hydrophobicizing pretreatment solution prepared from 1 part of a copolymer silicone composed of about 55% methylhydrodiene siloxane and about 45% dimethyl siloxane, that is, methylhydrodiene polysiloxane, and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the fabric in an amount of 0.6%.

Next, an emulsion type polyurethane dispersion composed of 11 parts of polyurethane having a polyester-ether copolymer-based soft segment, 1 part of a copolymer silicone comprised of about 60% of methylethoxy siloxane and about 40% of dimethyl siloxane, that is, methylethoxy polysiloxane, 50 parts of methylethylketone, 13 parts of toluene, and 15 parts of dimethylformamide was impregnated in the above-mentioned hydrophobicizing pretreated woven fabric, which was then wrung for a wringing rate of 150%.

Next, this dried at 80° C. for 3 minutes, then 120° C. for 3 minutes.

The flexural modulus and peel strength of the resultant sheet-like composite material are shown in Table 8.

The flexural modulus of the sheet-like composite material of the present invention was a low 0.47 and therefore the material was found to be extremely flexible compared with one where the fiber substrate was treated for water repellency (see Comparative Example 14) and one in which the fibrous substrate and the elastic polymeric substance were both not treated at all (see Comparative Example 15). Further, the peel strength was 1800 gf/inch, which is extremely high compared with the fluorine-based water repellent treated and calendered material (Comparative Example 16).

Comparative Example 6

The fabric obtained in Example 4 was immersed in a hydrophobicizing pretreatment solution prepared from 1 part of a copolymer silicone of about 55% methylhydrodiene siloxane and about 45% of dimethyl siloxane, that is, methylhydrodiene polysiloxane, and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the fabric in an amount of 0.6%. Next, a polyurethane solution composed of 11 parts of polyurethane having a polyester-ether copolymer-based soft segment and 89 parts of dimethylformamide was impregnated in the above-mentioned pretreated fabric. This was wrung for a wringing rate of 150%, was made to solidify in water for 6 minutes, was washed in warm water of 60° C. to 70° C. for 20 minutes, then was dried.

The flexural modulus of the resultant sheet-like composite material is shown in Table 4. The flexural modulus of the composite material is a high 0.027, which means the material gave a hard paper-like feel compared with the sheet-like material obtained in Example 4.

Comparative Example 7

The fabric obtained in Example 4 was impregnated with a polyurethane solution composed of 11 parts of polyurethane having a polyester-ether copolymer-based soft segment and 89 parts of dimethylformamide, then was wrung for a wringing rate of 150%, was made to solidify in water for 6 minutes, was washed in warm water of 60° C. to 70° C. for 20 minutes, then was dried.

The flexural modulus of the resultant sheet-like composite material is shown in Table 4. The flexural modulus of the sheet-like composite material was a high 0.031, which means the material gave a hard paper-like feel compared with the sheet-like material obtained in Example 4.

Comparative Example 8

The knitted fabric obtained in Example 5 was immersed in a hydrophobicizing pretreatment solution prepared from 1 part of a copolymer silicone of about 55% methylhydrodiene siloxane and about 45% of dimethyl siloxane, that is, methylhydrodiene polysiloxane, and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the fabric in an amount of 0.6%.

Next, a polyurethane solution composed of 11 parts of polyurethane having a polyester-ether copolymer-based soft segment and 89 parts of dimethylformamide was impregnated in the above-mentioned pretreated fabric. This was wrung for a wringing rate of 150%, was made to solidify in water for 6 minutes, was washed in warm water of 60° C. to 70° C. for 20 minutes, then was dried.

The flexural modulus of the resultant sheet-like composite material is shown in Table 5. The flexural modulus of the sheet-like composite material is a high 0.037, which means the material gave a hard paper-like feel compared with the sheet-like material obtained in Examples 5 and 6.

Comparative Example 9

The knitted fabric obtained in Example 5 was impregnated with a polyurethane solution composed of 11 parts of polyurethane having a polyester-ether copolymer-based soft segment and 89 parts of dimethylformamide, then was wrung for a wringing rate of 150%, was made to solidify in water for 6 minutes, was washed in warm water of 60° C. to 70° C. for 20 minutes, then was dried.

The flexural modulus of the resultant sheet-like composite material is shown in Table 5. The flexural modulus of the sheet-like composite material was a high 0.042, which means the material gave a hard paper-like feel compared with the sheet-like material obtained in Examples 5 and 6.

Comparative Example 10

The nonwoven fabric obtained in Example 7 was used. This was immersed in a hydrophobicizing pretreatment solution prepared from 1 part of a copolymer silicone of about 55% methylhydrodiene siloxane and about 45% of dimethyl siloxane, that is, methylhydrodiene polysiloxane, and 99 parts of water, then nip rolls were used to uniformly wring it out for a wringing rate of 100%. The fabric was then dried at 150° C. for 3 minutes in a hot air dryer. By this, the methylhydrodiene polysiloxane effective ingredient was deposited on the fabric in an amount of 1%.

Next, a polyurethane solution composed of 11 parts of polyurethane having a polyester-ether copolymer-based soft segment and 89 parts of dimethylformamide was impregnated in the above-mentioned pretreated nonwoven fabric. This was wrung for a wringing rate of 250%, was made to solidify in water for 6 minutes, was washed in warm water of 60° C. to 70° C. for 20 minutes, then was dried.

The flexural modulus of the resultant sheet-like composite material is shown in Table 6. The flexural modulus of the sheet-like composite material was a high 2.21, which means the material gave a hard paper-like feel compared with the composite material obtained in Examples 7, 8, and 9.

Comparative Example 11

The nonwoven fabric obtained in Example 8 was used and impregnated with a polyurethane solution composed of 11 parts of polyurethane having a polyester-ether copolymer-based soft segment and 89 parts of dimethylformamide, then was wrung for a wringing rate of 250%, was made to solidify in water for 6 minutes, was washed in warm water of 60° C. to 70° C. for 20 minutes, then was dried.

The flexural modulus of the resultant sheet-like composite material is shown in Table 6. The flexural modulus of the sheet-like composite material was a high 2.62, but the feel was hard and paper-like compared with the material of the present invention obtained in Examples 7, 8, and 9.

Comparative Example 12

The nonwoven fabric obtained in Example 8 was immersed in a pretreatment solution prepared from 0.3 part of a 60% methylethylketone solution of a surfactant A comprised of MDI, polyoxypropyleneglycol (PPG) of a weight average molecular weight of 1580, and polyethyleneglycol (PEG) of a weight average molecular weight of 1850 (PEG-MDI-PPG-MDI-PPG-MDI-PEG) and 99.7 parts of water, then nip rolls were used to uniformly wring it for a wringing rate of 150%. This was then dried at 180° C. for 1 minute in a hot air dryer to cause the surfactant A effective ingredient to deposit on the nonwoven fabric in an amount of 0.23%.

Next, a polyurethane solution composed of 11 parts of polyurethane having a polyester-ether copolymer-based soft segment, 0.9 part of the surfactant A, and 88.1 parts of dimethylformamide was impregnated in the pretreated nonwoven fabric. This was then wrung for a wringing rate of 250%, was caused to solidify in water for 6 minutes, then was washed in warm water of 60° C. to 70° C. for 20 minutes and then dried.

The flexural modulus of the resultant sheet-like composite material is shown in Table 6. The flexural modulus of the sheet-like composite material was a high 2.35, which means the material was flexible compared with the one where the fibrous substrate and the elastic polymeric substance were both not treated (see Comparative Example 11), but the feel was hard and paperlike compared with the material of the present invention shown in Examples 7, 8, and 9.

Comparative Example 13

The wool 48 count two-ply yarns used in Example 10 were impregnated with a polyurethane solution composed of 11 parts of polyurethane having a polyester-ether copolymer-based soft segment and 89 parts of dimethylformamide and then were wrung for a wringing rate of 150%, were caused to solidify in water for 6 minutes, then were washed in warm water of 60° C. to 70° C. for 20 minutes and then dried.

The flexural modulus and shrinkage rate of the obtained impregnated yarns are shown in Table 8.

The shrinkage rate of the composite material of the obtained impregnated yarns was 4%, and therefore, an anti-shrinking effect was observed, but the flexural modulus was a high 2.15 gfcm²/100 yarns, which means extreme hardness compared with the impregnated yarns of the present invention obtained in Example 10.

Comparative Example 14

The fabric obtained in Example 4 was immersed in a hydrophobicizing pretreatment solution prepared from 1 part of a copolymer siloxane comprised of about 55% methylhydrodiene siloxane and about 45% of dimethyl siloxane, that is, methylhydrodiene polysiloxane, and 99 parts of water, then nip rolls were used to uniformly wring it out for a wringing rate of 60%. The fabric was then dried at 150° C. for 3 minutes in a hot air dryer. By this, the methylhydrodiene polysiloxane effective ingredient was deposited on the nonwoven fabric in an amount of 0.6%.

Next, a polyurethane solution comprised of 20 parts of polyurethane having a polyester-ether copolymer-based soft segment and 80 parts of dimethylformamide was coated on the above-mentioned pretreated fabric by a knife coater to give 500 g/m². This was made to solidify in water for 6 minutes, was washed in warm water of 60° C. to 70° C. for 20 minutes, then was dried.

The flexural modulus and peel strength of the resultant sheet-like composite material are shown in Table 8. The peel strength of the sheet-like composite material was an extremely high 1610 gf/inch. However, the flexural modulus was a high 1.01, which means a harder feel compared with the one obtained in Example 11.

Comparative Example 15

The fabric obtained in Example 4 was coated with a polyurethane solution comprised of 20 parts of polyurethane having a polyester-ether copolymer-based soft segment and 80 parts of dimethylformamide by a knife coater to give 500 g/m², then was caused to solidify in water for 6 minutes, then was washed in warm water of 60° C. to 70° C. for 20 minutes and was dried.

The flexural modulus and the peel strength of the resultant sheet-like composite material are shown in Table 8. The peel strength of the sheet-like composite material was an extremely high 1650 gf/inch. However, the flexural modulus was a high 1.21 and the feel was hard compared with the one of the present invention shown in Example 8.

Comparative Example 16

The fabric used in Example 4 was treated for water repellency using a 2% aqueous solution of a fluorine-based water repellent. Next, this was subjected to hot calendering under conditions of a temperature of 160° C. and a linear pressure of 130 kg/cm so as to smooth the surface.

The fabric was coated with a polyurethane solution comprised of 20 parts of polyurethane having a polyester-ether copolymer-based soft segment and 80 parts of dimethylformamide by a knife coater to give 500 g/m², then was dried.

The flexural modulus and the peel strength of the resultant sheet-like composite material are shown in Table 5. The flexural modulus of the sheet-like composite material was a low 0.78, so the feel was flexible, but the peel strength was 750 gf/inch, which was low compared with the one of the present invention obtained in Example 11.

TABLE 1

| | Pretreatment solution | | | |
|---|---|---|---|---|
| | PVA concentration (%) | Dimethyl polysiloxane concentration (%) | Nn/Nt | Rs |
| Ex. 1 | 5.0 | 0.6 | 0.66 | 0.33 |
| Ex. 2 | 2.0 | 0.6 | 0.54 | 0.37 |
| Comp. Ex. 1 | 0 | 0.6 | 0.55 | 1.12 |
| Comp. Ex. 2 | 5.0 | 0 | 0.18 | 0.50 |
| Comp. Ex. 3 | 0 | 0 | 0.04 | 1.09 |

TABLE 2

| | Pretreatment solution | | | Bending hardness (gfcm²/cm) | | |
|---|---|---|---|---|---|---|
| | PVA concentration (%) | Dimethyl polysiloxane concentration (%) | Wear resistance (times) | Warp | Weft | Surface feel |
| Ex. 1 | 5.0 | 0.6 | 1500 | 0.25 | 0.26 | ○ |
| Ex. 2 | 2.0 | 0.6 | 1200 | 0.51 | 0.25 | ○ |
| Comp. Ex. 1 | 0 | 0.6 | 700 | 0.50 | 0.23 | Δ |
| Comp. Ex. 2 | 5.0 | 0 | 1600 | 0.80 | 0.45 | Δ |
| Comp. Ex. 3 | 0 | 0 | 2000 | 1.10 | 0.92 | x |

TABLE 3

| | Nn/Nt | Water pressure resistance (mmH₂O) | Flexural modulus | Peel strength (g/inch) | Moisture permeation (g/m² day) | Noisiness (grade) |
|---|---|---|---|---|---|---|
| Ex. 3 | 0.83 | 1200 | 0.30 | 1500 | 11000 | 5 |
| Comp. Ex. 4 | 0.11 | 1350 | 0.67 | 1650 | 10700 | 1 |
| Comp. Ex. 5 | 0.20 | 1200 | 0.48 | 700 | 11000 | 2 |

TABLE 4

| | Pretreatment | PU addition | Flexural modulus (gfcm²/cm) |
|---|---|---|---|
| Ex. 4 | MHSiO | MESiO | 0.017 |
| Comp. Ex. 6 | MHSiO | — | 0.027 |
| Comp. Ex. 7 | — | — | 0.031 |

TABLE 5

| | Pretreatment | PU addition | Flexural modulus (gfcm²/cm) |
|---|---|---|---|
| Ex. 5 | MHSiO | MESiO | 0.020 |
| Ex. 6 | MHSiO PVA | MESiO | 0.023 |
| Comp. Ex. 8 | MHSiO | — | 0.037 |
| Comp. Ex. 9 | — | — | 0.042 |

TABLE 6

|   | Pretreatment | PU addition | Flexural strength (gfcm²/cm) |
|---|---|---|---|
| Ex. 7 | MHSiO | MESiO | 1.05 |
| Ex. 8 | MHSiO PVA | MESiO | 1.21 |
| Ex. 9 | MHSiO anti-slip agent | MESiO | 1.33 |
| Comp. Ex. 10 | MHSiO | — | 2.21 |
| Comp. Ex. 11 | — | — | 2.62 |
| Comp. Ex. 12 | Surfactant A | Surfactant A | 2.35 |

TABLE 7

|   | Pretreatment | PU addition | Flexural modulus (gfcm²/100 yarns) | Shrinkage (%) |
|---|---|---|---|---|
| Ex. 10 | MHSiO | MESiO | 1.32 | 94 |
| Comp. Ex. 13 | — | — | 2.15 | 96 |
| Original yarn | — | — | 1.10 | 82 |

TABLE 8

|   | Pretreatment | PU addition | Flexural modulus | Peel strength (g/inch) |
|---|---|---|---|---|
| Ex. 11 | MHSiO | MESiO | 0.53 | 1500 |
| Ex. 12 | Fluorine-based water repellent | MESiO | 0.45 | 2000 |
| Ex. 13 | MHSiO | MESiO | 0.47 | 1800 |
| Comp. Ex. 14 | MHSiO | — | 1.01 | 1600 |
| Comp. Ex. 15 | — | — | 1.21 | 1650 |
| Comp. Ex. 16 | Fluorine-based water repellent | — | 0.78 | 750 |

[Industrial Applicability]

The composite material obtained by the present invention becomes an extremely flexible material in the case of a fabric impregnated with an elastic polymeric substance and, by giving it a distribution of density of impregnation of the elastic polymeric substance, can be used for industrial materials superior in wear resistance and other durability and tear strength and other dynamic strength, such as synthetic leather and artificial leather for apparel, furniture, shoes, and car seats. Further, in the case of a fabric coated with an elastic polymeric substance, not only is the material flexible and low in noisiness, but it has an extremely high peel strength. It is useful for various types of windbreakers to make them superior in moisture permeability and water pressure resistance, comforter covers, jerseys given a stretchback property, shape retention of stockings and other knit products, and prevention of shrinkage of wool, rayon, etc. upon washing.

Further, the invention is not limited to a fabric impregnated with an elastic polymeric substance or a fabric coated with an elastic polymeric substance. By making use of its flexible characteristic and adding to the elastic polymeric substance particles for an antibacterial, moisture permeation, heat storage, deodorizing, or other function, wide applications become possible for it as a functional processed fabric which is flexible and has wear resistance, wearability, and washing durability, such as for various types of sportswear, shoe materials, and medical applications (for example, anti-MRSA shirts and gowns).

We claim:

1. A composite material sheet comprising:
    a substrate material made of layers of fibers, an elastic polymeric a substance coating on said substrate and not bonded with a number of fibers, and an interface between the substrate and the elastic polymeric substance, wherein:
    (i) fibers at the interface are surrounded by, and spaced from said elastic polymeric substance so as to not be bonded with the elastic polymeric substance; and
    (ii) the number of fibers not bonded with the elastic polymeric substance, Nn, divided by a total number of fibers at the interface, Nt, results in a calculated ratio of Nn/Nt equal to 0.3 to 1.

2. The composite material sheet of claim 1, wherein said calculated ratio of Nn/Nt is equal to 0.5 to 1.

3. The composite material sheet of claim 1, wherein said elastic polymeric substance coating is 1 to 500 μm thick.

4. The composite material sheet of claim 1, wherein said substrate material is a plain weave of fibers.

5. A composite material sheet comprising:
    an elastic polymeric substance; and
    a substrate made of a total number of fibers and having an interior portion and at least one surface portion, said substrate impregnated with said elastic polymeric substance such that a number of said fibers are surrounded by, and spaced from said elastic polymeric substance so as to not be bonded with said elastic polymeric substance, wherein:
    (i) the number of fibers not bonded with the elastic polymeric substance, Nn, divided by the total number of fibers in the substrate, Nt, results in a calculated ratio of Nn/Nt equal to 0.3 to 1; and
    (ii) the interior portion of the substrate is impregnated to a greater extent than the at least one surface portion of the substrate.

6. The composite material sheet of claim 5, wherein said calculated ratio of Nn/Nt is equal to 0.5 to 1.

7. The composite material sheet of claim 5, wherein the interior portion of the composite material sheet comprises 5% to 40% elastic polymeric substance by weight.

8. The composite material sheet of claim 5, wherein the interior portion of the composite material sheet comprises 10% to 30% elastic polymeric substance by weight.

9. The composite material sheet of claim 5, wherein said substrate material is a non-woven fabric comprising three-dimensionally entangled fibers.

* * * * *